(12) United States Patent
Sandhu

(10) Patent No.: US 8,903,003 B2
(45) Date of Patent: Dec. 2, 2014

(54) COMMUNICATION STATION AND METHOD FOR TRANSMITTING OFDM SYMBOLS WITH CYCLIC-DELAY DIVERSITY (CDD)

(75) Inventor: Sumeet Sandhu, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 13/356,736

(22) Filed: Jan. 24, 2012

(65) Prior Publication Data
US 2012/0121032 A1     May 17, 2012

Related U.S. Application Data

(63) Continuation of application No. 12/643,035, filed on Dec. 21, 2009, now Pat. No. 8,126,077, which is a (Continued)

(51) Int. Cl.
*H04B 7/02* (2006.01)
*H04L 1/02* (2006.01)
(Continued)

(52) U.S. Cl.
CPC ........... *H04L 1/0071* (2013.01); *H04L 27/2607* (2013.01); *H04L 25/0216* (2013.01); *H04L 27/36* (2013.01); *H04L 1/0618* (2013.01); *H04L 27/2626* (2013.01); *H04L 27/2602* (2013.01); *H04L 5/0023* (2013.01)
USPC ........... 375/267; 375/260; 375/346; 375/299; 455/500; 455/101

(58) Field of Classification Search
CPC ......... H04L 27/2647; H04L 1/20; H04L 1/06; H04L 5/0007; H04L 27/2657; H04L 27/2662; H04L 5/0048; H04L 27/38; H04L 27/34; H04L 1/0041; H04L 1/0071; H04L 1/0618; H04L 25/0204; H04B 1/1027; H04B 1/123; H04B 1/1036; H04B 7/0845; H04B 7/0854; H04B 7/0857; H04B 7/0417; H04B 7/0669; H04B 7/0413; H04B 7/0617; H04B 7/0634; H04B 7/0671; H04W 16/28; H04W 88/02; H04W 52/42
USPC ................. 375/267, 346, 299, 260, 347, 261; 455/500, 101
See application file for complete search history.

(56) References Cited

U.S. PATENT DOCUMENTS 6,324,624 B1    11/2001    Wolrich et al.
6,377,632 B1    4/2002    Paulraj et al.
(Continued)

FOREIGN PATENT DOCUMENTS

CN      1898893 B     10/2011
JP      09298526     11/1997
(Continued)

OTHER PUBLICATIONS

"U.S. Appl. No. 10/750,549, Non Final Office Action mailed Apr. 8, 2008", 11 pgs.

(Continued)

*Primary Examiner* — Phuong Phu
(74) *Attorney, Agent, or Firm* — Schwegman Lundberg & Woessner, P.A.

(57) ABSTRACT

A communication station uses a plurality of antennas for transmission of orthogonal frequency division multiplexed (OFDM) symbols. The communication station includes an interleaver to interleave a block of encoded bits of an associated input bit stream for use in generating an output bit stream having a desired code rate. The communication station also includes circuitry to modulate the bits of the output bit stream to generate complex-valued modulation symbols, circuitry to map the modulation symbols for transmit diversity to layers for each of the antennas based on a number of antennas used and to further map the modulation symbols for each antenna onto resource elements, circuitry to cyclically shift the mapped modulation elements, circuitry to provide the cyclically-shifted modulation symbols for transmission by an associated one of the antennas, and circuitry to add a cyclic prefix to the modulation symbols prior to transmission.

10 Claims, 4 Drawing Sheets

Related U.S. Application Data continuation of application No. 10/750,549, filed on Dec. 31, 2003.

(60) Provisional application No. 60/503,092, filed on Sep. 15, 2003.

(51) Int. Cl.
*H04L 25/02* (2006.01)
*H04L 1/00* (2006.01)
*H04L 27/36* (2006.01)
*H04L 1/06* (2006.01)
*H04L 5/00* (2006.01)
*H04L 27/26* (2006.01)

(56) References Cited

U.S. PATENT DOCUMENTS

| | | |
|---|---|---|
| 6,473,467 B1 | 10/2002 | Wallace et al. |
| 6,532,509 B1 | 3/2003 | Wolrich et al. |
| 6,560,667 B1 | 5/2003 | Wolrich et al. |
| 6,667,920 B2 | 12/2003 | Wolrich et al. |
| 6,842,487 B1 | 1/2005 | Larsson |
| 7,167,684 B2 | 1/2007 | Kadous et al. |
| 7,242,720 B2 | 7/2007 | Sugiyama et al. |
| 8,126,077 B2 | 2/2012 | Sandhu |
| 2002/0154705 A1 | 10/2002 | Walton et al. |
| 2003/0103584 A1* | 6/2003 | Bjerke et al. ............. 375/340 |
| 2003/0235147 A1 | 12/2003 | Walton et al. |
| 2003/0236080 A1 | 12/2003 | Kadous et al. |
| 2010/0097997 A1 | 4/2010 | Sandhu |

FOREIGN PATENT DOCUMENTS

| | | |
|---|---|---|
| JP | 2002374224 | 12/2002 |
| JP | 2003032226 | 1/2003 |
| JP | 2003244092 | 8/2003 |
| JP | 2009298526 A | 12/2009 |
| WO | WO-0225857 A1 | 3/2002 |
| WO | WO-03049397 | 6/2003 |
| WO | WO-03049397 A2 | 6/2003 |
| WO | WO-2005067193 A1 | 7/2005 |

OTHER PUBLICATIONS

"U.S. Appl. No. 10/750,549, Non Final Office Action mailed Nov. 27, 2007", 13 pgs.
"U.S. Appl. No. 10/750,549, Notice of Allowance mailed Mar. 23, 2010", 6 pgs.
"U.S. Appl. No. 10/750,549, Notice of Allowance mailed Sep. 9, 2009", 8 pgs.
"U.S. Appl. No. 10/750,549, Response filed Feb. 26, 2008 to Non Final Office Action mailed Nov. 27, 2007", 12 pgs.
"U.S. Appl. No. 10/750,549, Response filed Jun. 25, 2009 to Non Final Office Action mailed Apr. 8, 2008", 10 pgs.
"Chinese Application Serial No. 200480038976.2, Office Action mailed Jan. 19, 2011", w/English translation, 6 pgs.
"Chinese Application Serial No. 200480038976.2, Office Action mailed Mar. 24, 2010", w/English translation, 9 pgs.
"Chinese Application Serial No. 200480038976.2, Office Action mailed May 8, 2009", w/English Translation, 9 pgs.
"Chinese Application Serial No. 200480038976.2, Office Action mailed Aug 19, 2010", w/English translation, 7 pgs.
"Chinese Application Serial No. 201010219831.X, Office Action mailed Apr. 13, 2011", w/English translation, 10 pgs.
"Chinese Application Serial No. 201010219831.X, Office Action mailed Oct. 10, 2011", w/English Translation, 12 pgs.
"Chinese Application Serial No. 201010219831.X, Office Action mailed Aug. 31, 2012", w/English translation, 8 pgs.
"Chinese Application Serial No. 201010219831.X, Response filed Feb. 24, 2012 to Office Action mailed Oct. 10, 2011", w/English translation of claims, 38 pgs.
"Chinese Application Serial No. 201010219831.X, Response filed Nov. 15, 2012 to Office Action mailed Aug. 31, 2012", w/English translation of claims, 8 pgs.
"European Application Serial No. 04815672.3, Office Action mailed Feb. 17, 2010", 4 pgs.
"European Application Serial No. 04815672.3, Office Action mailed Nov 18, 2010", 10 pgs.
"European Application Serial No. 04815672.3, Response filed Jul. 30, 2010 to Office Action mailed Feb. 17, 2010", 28 pgs.
"European Application Serial No. 10008027.4, European Search Report mailed Nov. 25, 2010", 8 pgs.
"European Application Serial No. 10008027.4, Office Action mailed Mar. 25, 2013", 6 pgs.
"European Application Serial No. 10008027.4, Office Action mailed Oct. 24, 2011", 9 pgs.
"European Application Serial No. 10008027.4, Preliminary Amendment filed Jun. 29, 2911", 12 pgs.
"European Application Serial No. 10008027.4, Response filed Apr. 30, 2012 to Office Action mailed Oct. 24, 2011", 15 pgs.
"Intel IXP 1200 Network Processor Family", Hardware Reference Manual, Intel, (Aug. 2001), 1-272.
"International Application Serial No. PCT/US2004/043655, International Preliminary Report on Patentability mailed Jul. 3, 2006", 8 pgs.
"International Application Serial No. PCT/US2004/043655, Search Report mailed Jan. 4, 2005", 2 pgs.
"International Application Serial No. PCT/US2004/043655, Written Opinion mailed Jan. 4, 2005", 7 pgs.
"Japanese Application Serial No. 2000-591930, Office Action mailed Mar. 25, 2008", w/ English Translation, 3 pgs.
"Japanese Application Serial No. 2004 527670, Office Action mailed Feb. 25, 2008", w/English translation, 11 pgs.
"Japanese Application Serial No. 2006-547479, Office Action mailed Mar. 9, 2009", w/English translation, 5 pgs.
"Japanese Application Serial No. 2006-547479, Office Action mailed Mar. 15, 2010", w/English translation, 4 pgs.
"Japanese Application Serial No. 2006-547479, Preliminary amendment filed Jul. 10, 2009", w/English translation, 10 pgs.
"Next-Generation Network SRAM", QDR, (May 14, 2001), 1-20.
"Singapore Application Serial No. 200603554-7, Office Action mailed Apr. 27, 2009", English only, 4 pgs.
"Singapore Application Serial No. 200603554-7, Written Opinion mailed Jul. 18, 2008", English only, 4 pgs.
"Singapore Application Serial No. 201003767-9, Search Report and Written Opinion mailed Nov. 15, 2011", English only, 14 pgs.
Office Action for Japanese Application No. P2006-547479 dated Feb. 27, 2009.
First Office Action for Chinese Application Serial No. 200480038976.2 (May 8, 2009).
Written Opinion for Singapore Patent Application No. 200603554-7 mailed Jul. 18, 2008, 8 pgs.
"U.S. Appl. No. 10/750,549, Non-Final Office Action mailed Apr. 8, 2008", 10 pgs.
"U.S. Appl. No. 10/750,549, Non-Final Office Action mailed Nov. 27, 2007", 12 pgs.
"U.S. Appl. No. 10/750,549, Response filed Feb. 26, 2008 to Non-Final Office Action mailed Nov. 27, 2007", 12 pgs.
"U.S. Appl. No. 10/750,549, Response filed Jun. 25, 2009 to Non-Final Office Action mailed Apr. 8, 2008", 10 pgs.
"U.S. Appl. No. 12/643,035 , Response filed Oct. 7, 2011 to Final Office Action mailed Jul. 14, 2011", 9 pgs.
"U.S. Appl. No. 12/643,035, Non Final Office Action mailed Jan. 25, 2011", 9 pgs.
"U.S. Appl. No. 12/643,035, Non Final Office Action mailed Jul. 14, 2011", 9 pgs.
"U.S. Appl. No. 12/643,035, Notice of Allowance mailed Oct. 24, 2011", 12 pgs.
"U.S. Appl. No. 12/643,035, Response filed May 6, 2011 to Non Final Office Action mailed Jan. 25, 2011", 11 pgs.
"European Application Serial No. 10008027.4, Extended European Search Report mailed Nov. 25, 2010", 9 pgs.
"International Application Serial No. 10/750,549, International Preliminary Report on Patentability mailed".

(56) References Cited

OTHER PUBLICATIONS

Bello, Philip A., "Characterization of Randomly Time-Variant Linear Channels", Communications, IEEE Transactions on [legacy, pre-1988], vol. 11, No. 4, Dec. 1963, 360-393.

Dammann, A., et al., "Standard conformable antenna diversity techniques for OFDM and its application to the DVB-T system", IEEE Global Telecommunications Conference, 2001. Globecom '01., (2001), 3100-3105.

Diggavi, et al., "Differential space-time coding for frequency selective channels", IEEE Communications Letters, vol. 6, No. 6, (Jun. 6, 2002), 253-255.

Gore, D., et al., "Delay diversity codes for frequency selective channels", IEEE International Conference on Communications, 2002. ICC 2002, vol. 3, (Apr. 2002), 1949-53.

Jagannadha, Rao, et al., "Low-complexity, full-diversity space-time-frequency block codes for MIMO-OFDM", IEEE Global Telecommunications Conference, XP010758881, (Nov. 29, 2004), 204-208.

Komninakis, Cristos, et al., "Fast Rayleigh fading simulation with an IIR filter and polyphase interpolation", RFDesign Satelite Communications, http://rfdesign.com/ar/fast-rayleigh-fading-simulation/ February 2008, 24-34.

Qian, Ma, et al., "Full diversity block diagonal codes for differential space-time-frequency coded OFDM", IEEE Global Telecommunications Conference, XP0106788446, (Dec. 1, 2003), 868-872.

Rouquette, et al., "Orthogonal full diversity space-time block coding based on transmit channel state information for 4 Tx antennas", IEEE International Conference on Communications, XP010589556, (Apr. 28, 2002), 558-562.

Shao, Lei, et al., "Rate-one space frequency block codes with maximum diversity gain for MIMO-OFDM", IEEE Global Telecommunications Conference, 2003. Globecom '03., (Dec. 2003), 809-13.

Wei, Zhang, et al., "A design of high-rate space-frequency codes for MIMO-OFDM systems", IEEE Global Telecommunications Conference, vol. 1, XP010758882, (Nov. 29, 2004), 209-213.

Weifeng, Su, et al., "Obtaining full-diversity space-frequency codes from space-time codes via mapping", IEEE Transactions on Signal Processing, vol. 51, No. 11, (Nov. 2003), 2905-2916.

Weifeng, Su, et al., "Systematic design of space-frequency codes with full rate and full diversity", IEEE Wireless Communications and Networking Conference, XP010708121, (Mar. 21, 2004), 1436-1441.

Yi, Gong, et al., "Space-frequency-time coded OFDM for broadband wireless communications", IEEE Global Telecommunications Conference, xp001090309, (Nov. 25, 2001), 519-523.

\* cited by examiner $$\left[ \begin{bmatrix} x_1 & x_2 & \cdots & x_{N/L} \\ x_{N/L} & x_1 & x_2 & \cdots \end{bmatrix}_1 \begin{bmatrix} x_1 & x_2 & \cdots & x_{N/L} \\ x_{N/L} & x_1 & x_2 & \cdots \end{bmatrix}_2 \cdots \begin{bmatrix} x_1 & x_2 & \cdots & x_{N/L} \\ x_{N/L} & x_1 & x_2 & \cdots \end{bmatrix}_L \right]$$

$$\left[ \begin{bmatrix} [b_1, b_5] & [b_9, b_{13}] & [b_{17}, b_{21}] \\ [b_{18}, b_{22}] & [b_2, b_6] & [b_{10}, b_{14}] \end{bmatrix}_1 \begin{bmatrix} [b_3, b_7] & [b_{11}, b_{15}] & [b_{19}, b_{23}] \\ [b_{20}, b_{24}] & [b_4, b_8] & [b_{12}, b_{16}] \end{bmatrix}_2 \right]$$

COMMUNICATION STATION AND METHOD FOR TRANSMITTING OFDM SYMBOLS WITH CYCLIC-DELAY DIVERSITY (CDD)

RELATED APPLICATIONS

This application is a continuation of U.S. patent application Ser. No. 12/643,035, entitled "MIMO TRANSMITTER AND METHODS FOR TRANSMITTING OFDM SYMBOLS WITH CYCLIC-DELAY DIVERSITY (CDD)," filed on Dec. 21, 2009, now issued as U.S. Pat. No. 8,126,077, which claims priority to U.S. patent application Ser. No. 10/750,549, entitled "METHODS AND APPARATUS TO CONTROL TRANSMISSION OF A MULTICARRIER WIRELESS COMMUNICATION CHANNEL THROUGH MULTIPLE ANTENNAS," filed on Dec. 31, 2003, which claims priority under 35 U.S.C. 119(e) to U.S. Provisional Patent Application Ser. No. 60/503,092, filed on Sep. 14, 2003, by Shao, et al., entitled "An Apparatus and Associated Methods to Implement a High-Throughput Wireless Communication System," all of which are expressly incorporated herein by reference in their entireties.

TECHNICAL FIELD

Embodiments of the present invention are generally directed to a wireless communication system and, more particularly, to methods and apparatus to control transmission of a multicarrier wireless communication channel through multiple antenna(e).

BACKGROUND

A multicarrier communication system such as, e.g., Orthogonal Frequency Division Multiplexing (OFDM), Discrete Multi-tone (DMT) and the like, is typically characterized by a frequency band associated with a communication channel being divided into a number of smaller sub-bands (subcarriers herein). Communication of information (e.g., data, audio, video, etc.) between stations in a multicarrier communication system is performed by dividing the informational content into multiple pieces (e.g., symbols), and then transmitting the pieces in parallel via a number of the separate subcarriers. When the symbol period transmitted through a subcarrier is longer than a maximum multipath delay in the channel, the effect of intersymbol interference may be significantly reduced.

While multicarrier communication systems hold the promise of high throughput communication channels, technical challenges persist. For example, in certain applications such as, for example a wireless local area network (WLAN) deep fades can occur in the channel that may persist over a significant period of time. Further, due to environmental conditions (e.g., home office, business, etc.), the wireless channels may typically encounter significant dispersion due to multipath propagation that limits the maximum achievable rates.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Embodiments of an apparatus and associated methods to control transmission of a multicarrier wireless communication channel are generally introduced herein. In this regard, aspects of the present invention may well be used to implement any of a number of wireless communication platforms such as, e.g., wireless local area network (WLAN), wireless personal area network (WPAN), wireless metro-area networks (WMAN), cellular networks, and the like.

With this disclosure, an innovative approach to improving the resilience of the multicarrier communication channel is disclosed, wherein an advanced OFDM processing technique is added to a multiple input, multiple output (MIMO) transceiver that utilizes more than one transmit/receive chain at each end of the wireless link. Those skilled in the art will appreciate, in view of the following discussion, that the disclosed combination of MIMO and OFDM (MIMO-OFDM) appears particularly promising for high-throughput wireless LAN application.

According to a first aspect of the invention, a transmit diversity capability is introduced, which provides a near-optimal method for mapping uncoded content (e.g., quadrature amplitude modulation (QAM) symbols) received from a host device, or an application/agent executing thereon, to multiple antennas and OFDM tones. While the transmit diversity architecture introduced herein provides full-order diversity, it may only provide a limited code rate per OFDM slot.

According to another aspect of the invention, the transmit diversity architecture is extended to provide a higher code rate by means of space-frequency interleaving (SFI). As developed more fully below, SFI provides a near-optimal technique for mapping coded information (e.g., bits, frames, symbols, etc.) onto multiple antennas and OFDM tones.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Environment

Figure 1:
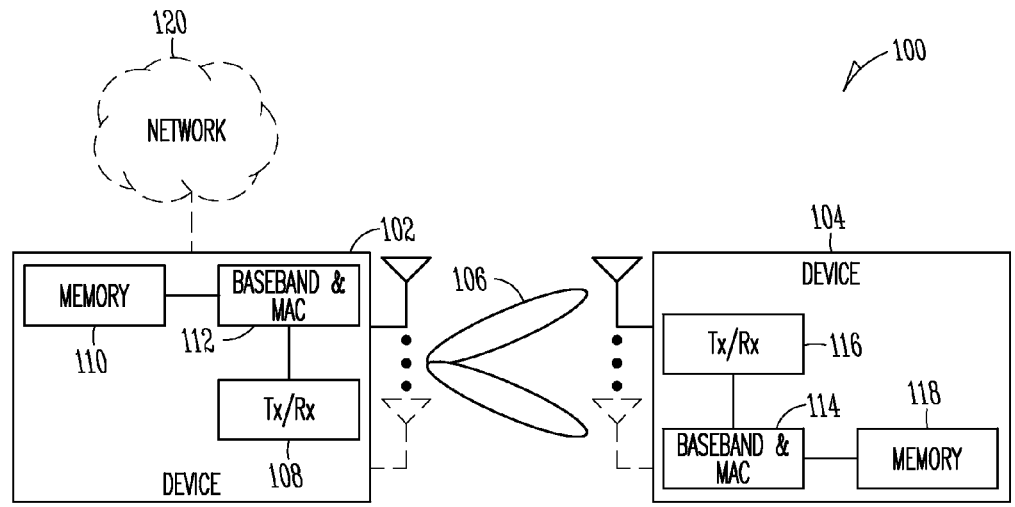
FIG. 1 is a block diagram of an example multicarrier wireless network incorporating the teachings of the present invention, according to one example implementation.

FIG. 1 illustrates a block diagram of a wireless communication environment within which the teachings of the present invention may be practiced. As shown, network 100 depicts two devices 102, 104, each comprising one or more wireless transmitter(s) and receiver(s) (cumulatively, a transceiver) 108, 116, baseband and media access control (MAC) processing capability 112, 114, and memory 110, 118, each coupled as shown. As used herein, the devices 102, 104 communicate information between one another via a multicarrier wireless communication channel 106, established between the transceiver(s) 108, 116 through one or more antenna(e) associated with the devices. According to one embodiment, one of the devices 102 may be coupled to another network 120.

According to one aspect of the invention, an innovative diversity agent is introduced within the device(s) introduce and manage one or more elements of diversity within the multicarrier wireless channel. On the transmit side of a communication channel, the diversity agent may selectively map content (e.g., received from a host device, application, agent, etc.) to one or more antenna(e) and/or OFDM tones to generate a MIMO-OFDM transmit signal. In support of the receive side of the communication channel, the diversity agent may selectively demap the content received via the MIMO-OFDM wireless channel (e.g., 106) from multiple antennas and OFDM tones. While not specifically denoted in FIG. 1, the diversity agent may well be implemented in one or more of the baseband and MAC processing element(s) (112, 114) and/or the transceiver element(s) (108, 116), although the invention is not so limited.

According to one example embodiment, the diversity agent may selectively process content received from the host device (e.g., 102, 104) to implement full-order transmit diversity, although the invention is not limited in this respect. As developed below, diversity agent may map uncoded content (e.g., quadrature amplitude modulated (QAM) symbols) received from the host device (102, 106) or applications executing thereon, onto multiple antennas and OFDM tones to effect spatial diversity in the transmit link of channel (106).

According to one embodiment, the diversity agent may selectively process content received from the host device (e.g., 102, 104) to introduce space-frequency interleaving (SFI) of the content onto multiple antennas and OFDM tones. In this regard, as developed below, diversity agent may selectively map coded information (e.g., bits, bytes, blocks, symbols, frames, packets, etc.) received from the host device or applications executing thereon, onto multiple antennas and OFDM tones by performing one or more of antenna multiplexing, 802.11a interleaving, QAM mapping, and cyclic tone shifting, although the invention is not limited in this regard.

In addition to the foregoing, the diversity agent may selectively implement an innovative technique(s) for decoding information from a received OFDM channel processed as above. In this regard, an innovative receive diversity agent is introduced to demap and/or deinterleave content received from a channel 106 generated in accordance with one or both of the encoding techniques introduced above. According to one embodiment, receive diversity agent receives content as decoded modulation information (e.g., bits) and generates de-mapped and/or de-interleaved content, respectively.

But for the introduction of the diversity agent introduced above, devices 102, 104 are intended to represent any of a wide range of electronic devices with wireless communication capability including, for example, a laptop, palmtop or desktop computer, a cellular telephone (e.g., a 2G, 2.5G, 3G or 4G handset), a personal digital assistant, an WLAN access point (AP), a WLAN station (STA), and the like.

As used herein, baseband and MAC processing element(s) 112, 114 may be implemented in one or more processors (e.g., a baseband processor and an application processor), although the invention is not limited in this regard. As shown, the processor element(s) 112, 114 may couple to memory 110, 118, respectively, which may include volatile memory such as DRAM, non-volatile memory such as Flash memory, or alternatively may include other types of storage such as a hard disk drive, although the cope of the invention is not limited in this respect. Some portion or all of memory 110, 118 may well be disposed within the same package as the processor element(s) 112, 114, or may be disposed on an integrated circuit or some other medium external to element(s) 112, 114. According to one embodiment, baseband and MAC processing element(s) 112, 114 may implement at least a subset of the features of diversity agent described below, and/or may provide control over a diversity agent implemented within an associated transceiver (108, 116), although the invention is not limited in this regard.

Similarly, but for the introduction of the diversity agent to effect the MIMO-OFDM channelization developed more fully below, transceivers 108, 116 are also intended to reflect any of a variety of multicarrier wireless communication transceivers known in the art. In this regard, a transmitter element of the transceivers receive content from a host device, process the received content to generate an OFDM transmit signal, and then transmits that OFDM signal over a link (e.g., forward link) to a remote device via one or more antennae. A receiver element of the receivers receives multiple instances of the forward link via one or more antenna(e), and selectively processes the received signal(s) to extract a representation of the originally encoded content. Again, the introduction of the diversity agent enables the wireless transceiver within the device(s) to implement the MIMO-OFDM features described below. According to one embodiment, each of the transmitters and receivers may well include one or more processing chains.

As used herein, network 120 is intended to represent any of a broad range of communication networks including, for example a plain-old telephone system (POTS) communication network, a local area network (LAN), metropolitan area network (MAN), wide-area network (WAN), global area network (Internet), cellular network, and the like. According to one example implementation, device 102 represents an access point (AP), while device 104 represents a station (STA), each of which suitable for use within an IEEE 802.11n wireless local area network (WLAN), and each utilizing the innovative space-frequency interleaving and transmit diversity techniques introduced above, and developed more fully below.

Example Transceiver Architecture

Figure 2:
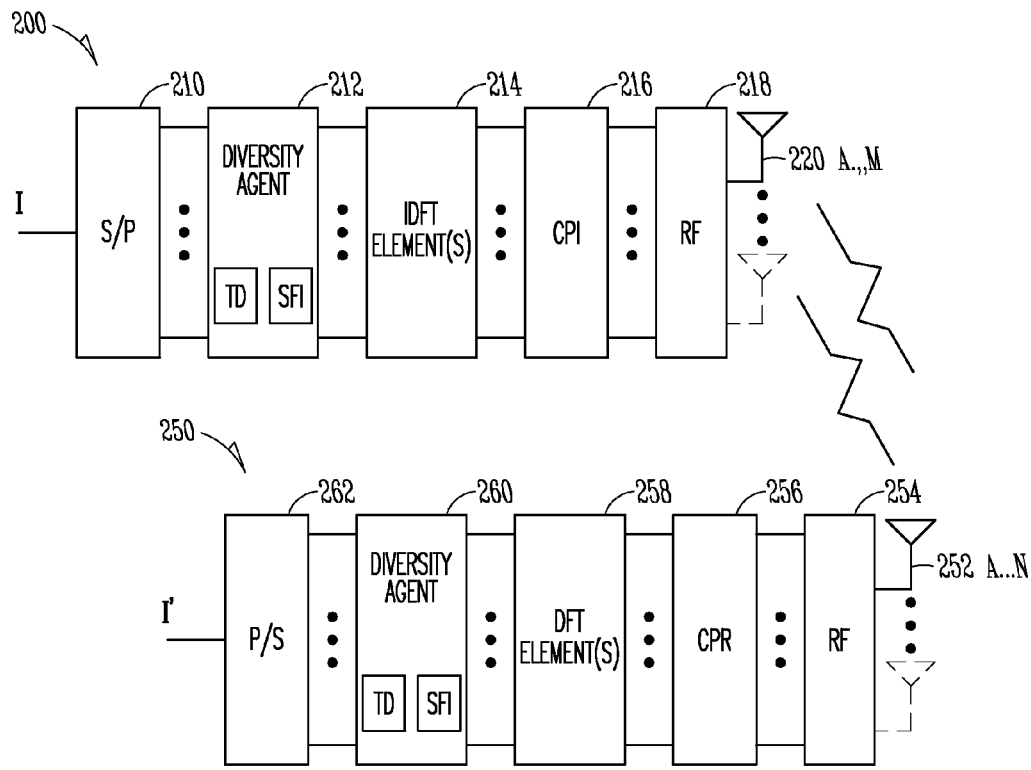
FIG. 2 is a block diagram of an example transceiver incorporating the teachings of the present invention, according to one example implementation.

FIG. 2 illustrates a block diagram of an example transmitter architecture and an example receiver architecture according to one example embodiment of the invention. To illustrate these architectures within the context of a communication channel between two devices, a transmitter from one device (e.g., 102) and a receiver from another device (e.g., 104) associated with a communication link are depicted. Those skilled in the art will appreciate that a transceiver in either device (102, 104) may well comprise a transmitter architecture and a receiver architecture as detailed in FIG. 2, although the scope of the invention is not limited in this regard. It should be appreciated that transmitter and receiver architectures of greater or lesser complexity that nonetheless implement the innovative transmit diversity and/or space-frequency interleaving described herein are anticipated by the scope and spirit of the claimed invention.

According to one example embodiment, a transmitter architecture 200 is depicted comprising one or more of a serial to parallel transform 210, a (transmit) diversity agent 212, one or more inverse discrete Fourier transform (IDFT) element(s) 214, a cyclic prefix, or guard interval, insertion element 216 coupled with one or more antenna(e) 220A ... M through an associated one or more radio frequency (RF) elements 218, although the invention is not limited in this regard. According to one embodiment, transmitter architecture 200 may be implemented within transceiver 108 and/or 116. Although depicted as a number of separate functional elements, those skilled in the art will appreciate that one or more elements of transmitter architecture 200 may well be combined into a multi-functional element, and conversely functional elements may be split into multiple functional elements without deviating from the invention.

As used herein, serial-to-parallel (S/P) transform 210 receives information (e.g., bits, bytes, frames, symbols, etc.) from a host device (or, an application executing thereon, e.g., email, audio, video, etc.) for processing and subsequent transmission via the communication channel. According to one embodiment, the received information is in the form of quadrature amplitude modulated (QAM) symbols (i.e., wherein each symbol represents two bits, $b_i$ and $b_j$). According to one embodiment, serial-to-parallel transform 210 takes the information and generates a number of parallel substreams of the information, which are passed to one or instances of diversity agent 212. Although depicted as a separate functional element, serial to parallel transform 210 may well be included within the diversity agent 212, or other element of the transmitter 200.

According to one embodiment, diversity agent 212 selectively introduces an element of transmit diversity into the information streams received from the S/P transform 210. In particular, according to one example embodiment, the informational content is selectively mapped to one or more antenna(e) and OFDM tones. According to one example implementation, if content received from the host device at diversity agent 212 is not in the form of QAM symbols, diversity agent may perform pre-coding to map the received information to QAM symbols, although the invention is not limited in this regard. Indeed, diversity agent may well introduce transmit diversity to any linear combination of input symbols.

In any case, diversity agent 212 takes the input (e.g., QAM symbols) and repetitively disperses them (bits, symbols, etc.) across Mt transmit antennas, and a number (N) of OFDM tones for each of a plurality of Rayleigh fading channel taps (L), although the invention is not limited in this regard. By selectively dispersing the content in this manner, full order diversity (Mt Mr L, where Mr is the number of receive antennae) may be achieved. An example method for introducing transmit diversity is presented below with reference to FIG. 3, and a graphical illustration of symbols processed in accordance with an example transmit diversity mechanism is provided in FIG. 5.

In accordance with another aspect of the invention, diversity agent 212 may well include the resources to implement a space-frequency interleaving (SFI) mechanism. In this regard, diversity agent 212 may well include one or more of an antenna multiplexing element, a tone interleaving element, a QAM interleaving element, a QAM mapping element and a cyclic tone shifting element, although the invention is not limited in this regard. According to one embodiment, diversity agent 212 may treat adjacent coded bits as one symbol, and spreads this information across space and frequency, e.g., using the transmit diversity repetition scheme introduced above. According to one embodiment, the content received from S/P transform 210 is first interleaved across at least a subset of transmit antenna(e) Mt, and then across a number of OFDM tones for each of a plurality of the Rayleigh fading channel taps (L), although the invention is not limited in this regard. Indeed, these functional elements need not necessarily be applied in the order described above. Moreover, the amount of cyclic tone shift may well be modified to any value between zero (0) and the number data tones (Nds), and there may be a cyclic shift across antennas instead of, or in addition to the shift across tones. An example method for implementing the space-frequency interleaving is developed more fully below, with reference to FIG. 4, and a graphical representation of SFI is presented with reference to FIG. 6.

In either case, content from the transmit diversity agent 212 is passed to one or more inverse discrete Fourier transform (IDFT) element(s) 214. According to one embodiment, an inverse fast Fourier transform (IFFT) element(s), although the invention is not limited in this regard. According to one embodiment, the number of IDFT elements 214 is commensurate with the number of transmit antenna(e), i.e., transmit radio frequency (RF) chains. In this regard, IDFT element(s) 214 may receive a plurality (Z) of encoded substreams from the diversity agent 212, and converts the content from a frequency domain representation to a time domain representation of the content, although the invention is not limited in this regard.

The time domain content from the IDFT element(s) 214 is passed to CPI element(s) 216. According to one embodiment, CPI 216 may introduce a cyclical prefix, or a guard interval in the signal, before it is passed to a radio frequency (RF) front-end 218 for amplification, filtering and subsequent transmission via an associated one or more antenna(e) 220A ... M.

To extract content processed by a transmitter architecture 200, above, an example receiver architecture 250 is introduced. As shown, an RF front-end 254 receives a plurality of signals impinging on one or more receive antennae 240A ... N. For ease of explanation and description going forward, in accordance with one example embodiment, the number (N) of receive antenna(e) is equal to Mr. According to one embodiment, each receive antenna has a dedicated receive chain, where the number of receive front-end elements 254, CPR elements 256 and FFT elements are commensurate with the number (N) of receive antenna(e) (e.g., Mr).

The RF front end 254 may pass at least a subset of the received signal(s) to a cyclic prefix removal element(s) 256, although the invention is not limited in this regard. According to one embodiment, CPR 256 removes any cyclic prefix or guard interval that may have been introduced during transmit processing of the received signal(s).

The content from CPR 256 is then provided to an associated one or more of fast Fourier transform (FFT) element(s) 258. According to one embodiment, FFT elements 258 transform the received signals from an associated receive chain from the time domain to the frequency domain, for subsequent demultiplexing and decoding of a representation of the content embedded within the received transmission. Thus, a plurality of frequency domain representations of the received signal(s) are presented to receive diversity agent 260.

According to one aspect of the present invention, receive diversity agent 260 may perform a complementary function to that performed by transmit diversity agent 212. In this regard, receive diversity agent 260 may perform the complement to the transmit diversity and/or space frequency interleaving introduced above. In the case of transmit diversity, receive diversity agent 260 may demap the QAM symbols, prior to QAM demodulation and parallel to serial conversion 262 to extract a representation (I') of the content encoded within the received signal(s). In the case of SFI, receive diversity agent 260 performs deinterleaving and decoding, before providing the output content to the parallel to serial converter 262 which generates the representation (I') of the content encoded within the received signal(s). According to one embodiment, diversity agent 260 may well implement a minimum mean square error (MMSE) spatial demapper followed by soft Viterbi decoding, although the invention is not limited in this regard.

Although depicted as a number of functional blocks, those skilled in the art will appreciate that one or more of the foregoing elements may well be implemented in hardware, software, firmware, or any combination thereof. Moreover, although not explicitly denoted, it will be appreciated by those skilled in the art that one or more elements such as, e.g., diversity agent 212, 260 may well receive control input from baseband and/or MAC processing elements (e.g., 112, 114). According to one embodiment, diversity agents 212, 260 may well implement one or more of transmit diversity and space-frequency interleaving, and communicate which MIMO-OFDM scheme is being used through an exchange of channel state information. In this regard, diversity agent 212, 260 and the transmit diversity/SFI techniques associated therewith, may be adapted according to observed channel delay spread and transmit or receive antenna correlation information (i.e., channel state information).

Example Diversity Agent Operation

Having briefly introduced an example network environment and diversity agent architecture, above, a discussion of each of the MIMO-OFDM techniques introduced herein will now be developed more fully with reference to FIGS. 3-7. For ease of description and understanding, the development of these techniques will be presented in flow-chart form with continued reference, where appropriate, to example elements in FIGS. 1 and 2, although the invention is not limited in this regard.

Figure 3:
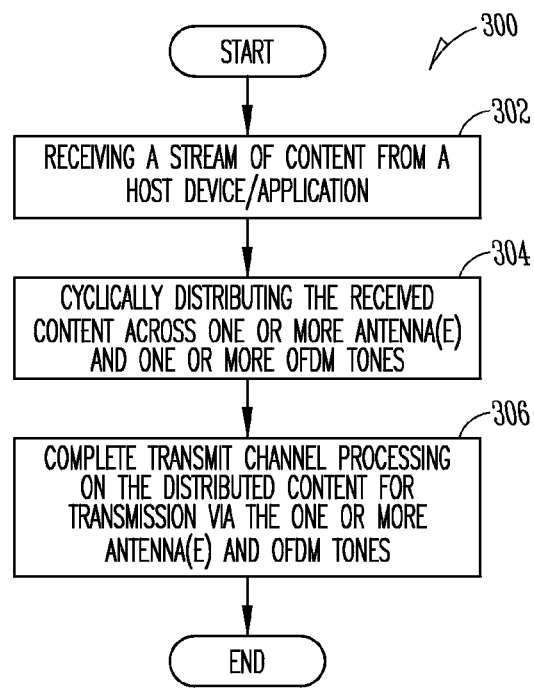
FIG. 3 is a flow chart of an example method for mapping information to one or more antenna(e) and subcarrier(s), according to one embodiment of the invention.

Turning to FIG. 3, a flow chart of an example method 300 for implementing transmit diversity is disclosed, according to one example embodiment. As shown, the method begins with block 302, wherein the diversity agent 212 receives content for processing. According to one example embodiment, the received content is a plurality of substreams of information received from a serial to parallel transform, although the invention is not limited in this regard. According to one embodiment, the received content is in the form of complex symbols that are linear or nonlinear combinations of input QAM symbols. According to one embodiment, diversity agent 212 may receive the content from a QAM modulator, wherein the received content is in the form of QAM symbols, although the invention is not limited in this regard. According to another embodiment, diversity agent 212 receives uncoded information stream(s) of bits, and converts the content into QAM symbols.

In block 304, diversity agent 212 cyclically distributes the QAM symbols across one or more antennae and one or more OFDM tones. According to one embodiment, diversity agent 212 captures spatial diversity through the development of Mt×N/L blocks of QAM symbols (where N is the number of OFDM tones, and L is the number of Rayleigh fading channel taps), where the symbols applied to each antenna are offset by a cyclical shift. By repeating these frequency blocks L times across the number of OFDM tones, diversity agent 212 introduces an element of frequency diversity into the channel as well.

According to one example embodiment, the number of frequency blocks may be adaptively modified according to multipath conditions in the channel. In this regard, a larger delay spread among frequency blocks may be employed by diversity agent 212 when there is high delay spread (L), and fewer blocks may be used for lower delay spread. Moreover, when there is a risk of horizontal wraparound of symbols, wherein the same symbol is transmitted on the same tone, or a very close tone, on a different antenna, diversity agent 212 may well increase or decrease the dispersion to remove this wraparound condition, as appropriate. A graphical illustration of the transmit diversity blocks are presented with reference to FIG. 5.

In block 306, the blocks generated by diversity agent 212 are provided to the remainder of the transmit processing chain (e.g., IFFT 214, et seq.) to enable the transmitter to complete channel processing on the distributed content for transmission via the one or more antenna(e) and OFDM tones.

Figure 4:
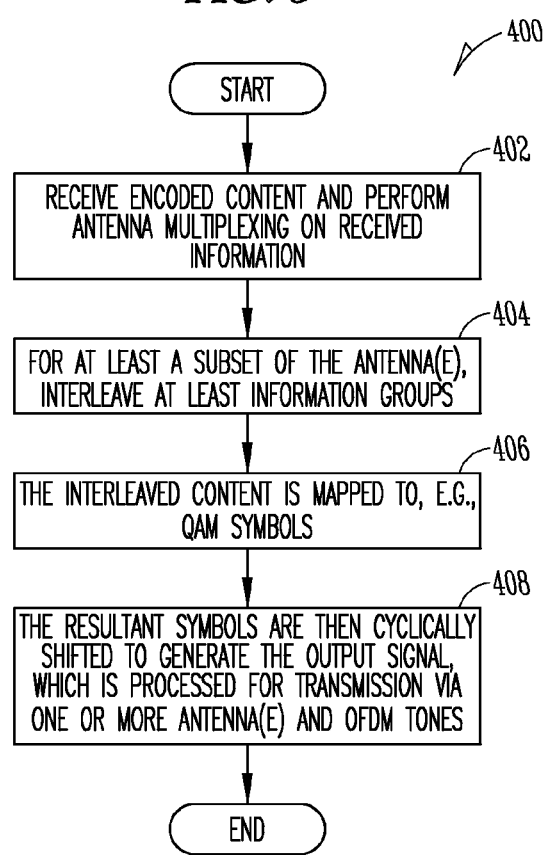
FIG. 4 is a flow chart of an example method for mapping information to one or more antenna(e) and subcarrier(s), according to one embodiment of the invention.

Turning to FIG. 4, a flow chart of an example method 400 for implementing space-frequency interleaving (SFI) is introduced, according to one embodiment of the invention. As shown, the technique begins in block 402, where diversity agent 212 receives encoded content. As above, the encoded content may be received, e.g., from forward error correcting (FEC) encoder, a convolutional encoder, a Reed Solomon encoder, and LDPC encoder, a trellis encoder, a turbo coder a BCH coder, etc., which may be an element of diversity agent 212, although the invention is not limited in this regard. According to one implementation, diversity agent 212 may assume a sliding window memory such as that provided by a convolutional encoder, although the invention is not limited in this respect. Indeed, for other codes, diversity agent 212 may rearrange/interleave the input so as to be correlated in a sliding window fashion. In general, the output codeword from any code may be treated as a QAM symbol $x_1$, per the transmit diversity aspect described above, and constituent codeword bits may then be spread using the space-frequency interleaving techniques described herein.

Diversity agent 212 may then perform antenna multiplexing on the received encoded information. According to one embodiment, adjacent bits of the received content are first mapped to the Mt antennas. For example, assume the total number of bits=Mt*$N_{CBPS}$, where $N_{CBPS}$ is the number of coded and punctured bits mapped to forty-eight (48) tones of an OFDM symbol (as used, e.g., in accordance with the IEEE Std. 802.11a (1999) specification, the disclosure of which is expressly incorporated herein by reference for all purposes), although the invention is not limited in this regard. The bits indexed by m:Mt:Mt*$N_{CBPS}$ are mapped to the $m^{th}$ antenna.

In block 404, diversity agent 212 may interleave the resulting groups of $N_{CBPS}$ bits on each antenna. According to one embodiment, diversity agent 212 may implement this interleaving in accordance with the 802.11a interleaver, which consists of two elements: tone interleaving, and QAM interleaving (see, e.g., IEEE Std. 802.11a-1999, Part 11: Wireless LAN Medium Access Control (MAC) and Physical Layer (PHY) specifications, incorporated herein for all purposes).

According to one example embodiment, diversity agent 212 may ensure that adjacent coded bits are mapped onto nonadjacent subcarriers to perform the tone interleaving. According to one embodiment, the interleaver depth determines how many tones separate adjacent coded bits. In general, this separation should be equal to the coherence bandwidth of the channel, e.g., $N/L_R$ (where N=DFT size, and $L_R$=the length of the channel response in time), although the invention is not limited in this respect. In this regard, the interleaver depth is proportional to the length of the channel impulse in time ($L_R$).

As used herein, according to one embodiment, interleaver depth may be defined as the separation between bits on adjacent tones in each frequency block. For example, if there are 1:48 input bits to be mapped to 48 tones with a depth of 16 (i.e., per 802.11a interleaver), where the bits are mapped to tones 1:48 column-by-column, bits 1, 17, 33 and 2 are mapped to tones 1, 2, 3 and 4, respectively. More particularly, the mapping would look like:

| 1  | 2  | 3  | 4  | 5  | 6  | 7  | 8  | 9  | 10 | 11 | 12 | 13 | 14 | 15 | 16 |
|----|----|----|----|----|----|----|----|----|----|----|----|----|----|----|----|
| 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 |

If we change the depth to 12, we get the following mapping, where bits 1, 13, 25, 37 and 2 are mapped to tones 1, 2, 3, 4 and 5 respectively:

| 1  | 2  | 3  | 4  | 5  | 6  | 7  | 8  | 9  | 10 | 11 | 12 |
|----|----|----|----|----|----|----|----|----|----|----|----|
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 |

According to one example embodiment, diversity agent 212 may adapt the interleaver depth to the observed value of L. Depending on perceived multipath conditions, a high L will result in a large interleaver depth, and vice versa. According to one embodiment, diversity agent 212 may set the interleaver depth based on a worst case channel response condition, e.g., where L=worst case delay spread=length of the cyclic prefix of an OFDM symbol (e.g., 16 in an 802.11a compliant system).

Thus, for arbitrary values of N (e.g., 96 or 108 when multiple 802.11a channels are bonded together to provide high throughput), a key design criterion that determines performance contemplated by the diversity agent 212 is the separation of adjacent coded bits as a function of the channel's coherence bandwidth. If the channel bandwidth increases as in channel bonding without affecting inter-tone spacing, the coherence bandwidth will not change (over the same set of multipath channels). If a larger DFT size is taken within the same channel bandwidth, diversity agent 212 may change the tone spacing such that adjacent coded bits are separated accordingly by a proportionally larger number of tones.

To perform QAM interleaving, diversity agent 212 may ensure that adjacent coded bits are mapped alternately onto less and more significant bits of the constellation and, as such, long runs of low reliability (LSB) bits are avoided. According to one example embodiment, diversity agent 212 performs the tone and QAM interleaving in accordance with the following mathematical descriptions, respectively:

$$i = (N_{CBPS}/16)(k \bmod 16) + \text{floor}(k/16) \qquad [1]$$

where $k=0, 1, \ldots, N_{CBPS-1}$; and the function floor denotes the largest integer not exceeding the parameter.

$$j = s \times \text{floor}(i/s) + (i + N_{CBPS} - \text{floor}(16 \times i/N_{CBPS})) \bmod s \qquad [2]$$

where the value of s is determined by the number of coded bits per subcarrier, $N_{BPSC}$, according to $s = \max(N_{BPSC}/2, 1)$. According to one embodiment, a diversity agent 260 in a receiver may employ a deinterleaver which performs the inverse relation defined by the above two permutations, although the invention is not limited in this regard.

In block 406, diversity agent 212 may map the interleaved content to QAM symbols. According to one embodiment, diversity agent 212 may include a bit-to-QAM mapper, wherein multiple bits are mapped to the QAM symbols. According to one example embodiment, the OFDM subcarriers are modulated using BPSK, QPSK, 16-QAM, 64-QAM, 128-QAM or 256-QAM, depending on the coding rate to be employed, but the scope of the invention is not limited in this regard. According to one embodiment, the encoded and interleaved binary serial input data may be divided into groups of $N_{BPSC}$ (e.g., 1, 2, 4 or 6) bits and converted into complex numbers representing QAM constellation points. The conversion may be performed according to Gray coded constellation mappings, although the invention is not limited in this respect.

In block 408, diversity agent 212 introduces a cyclic shift to the resultant QAM symbols on each antenna with respect to the other antenna(e). According to one embodiment, as introduced above, diversity agent 212 shifts the symbols destined for the $m^{th}$ antenna by m−1 tones vis-à-vis the $1^{st}$ antenna. As used herein, the cyclic tone shift introduced by diversity agent may well be greater than 1. Indeed, according to one embodiment, the cyclic tone shift introduced by diversity agent 212 is adaptive based, at least in part, spatial correlation—the more correlated the fading on different antennas, the greater the tone shift from antenna to antenna. In certain implementations, e.g., where the number of transmit antennas (Mt) is high, diversity agent may shift by more than one tone from antenna to antenna to avoid wrap around and ensure good performance.

In this regard, according to one embodiment, diversity agent 212 may repeat each bit Mt times, and then perform the SFI technique introduced herein on the larger coded sequence. For example, if the original coded bit sequence is [b1, b2, b3, b4] and there are two transmit antennas (Mt=2), diversity agent 212 may expand the received bit sequence to [b1 b1 b2 b2 b3 b3 b4 b4]. It should be appreciated, from the disclosure herein, that there may be other ways to expand each the coded sequence rather than simple repetition, e.g., by taking into account the resulting multidimensional space-frequency constellations, etc.

The space-frequency interleaved blocks are then processed for transmission via one or more antenna(e) and OFDM tones, as introduced above. An example graphical illustration of the space-frequency interleaved blocks generated by diversity agent 212 is provided with reference to FIG. 6, below.

Although not particular detailed, those skilled in the art will appreciate from the discussion above, that a receive diversity agent 260 may implement selectively implement either of the foregoing methods in a complementary (e.g., reverse) order to demap, or deinterleave, respectively, content received on signals processed in accordance with the above transmit diversity or space-frequency interleaving techniques. For example, the deinterleaving technique may comprise one or more of cyclically shifting the tones, QAM to bit mapping, deinterleaving, and antenna demultiplexing, although the invention is not limited in this regard.

Figures 5, 6, 7:
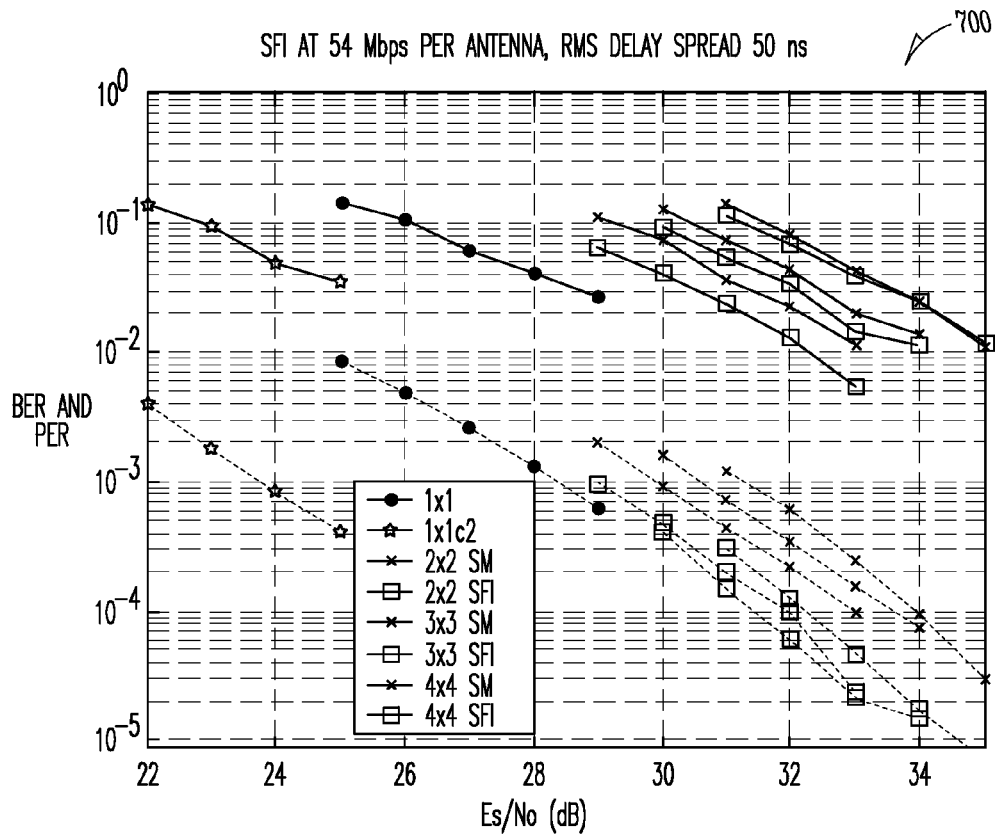
FIGS. 5 and 6 provide graphical illustrations of transmit diversity and space-frequency interleaving for two transmit antennas, in accordance with embodiments of the present invention.
FIG. 7 is a graphical illustration of the improvement to one or more channel characteristics through use of an embodiment of the invention.

Turning to FIG. 5, a graphical illustration of an example transmit diversity blocks generated in accordance with an embodiment of the invention is presented. In accordance with the example embodiment of FIG. 5, a diversity block of Mt×N/L is used. In this case, diversity agent 212 generates an L number 2×N/L matrices of QAM symbols. The technique illustrated in FIG. 5 is extensible to cover situations of Mt>2 by, e.g., incrementing the cyclic delay on each additional transmit antenna according to (Mt−1) on successive antennae. It should be appreciated that the space frequency codeword in FIG. 5 is from a Viterbi decoder that decodes across tones while taking into account the repetition of symbols across L blocks, although the invention is not limited in this regard.

Turning to FIG. 6 a graphical illustration of an example space-frequency interleaving blocks generated in accordance with an embodiment of the invention is illustrated. As above, for ease of illustration and not limitation, the SFI blocks depicted correspond to an embodiment wherein Mt=2, but is extensible to implementations of Mt>2 in accordance with the techniques described above.

FIG. 7 presents a graphical illustration evidencing the performance characteristics associated with various mapping techniques (i.e., single input, single output (1×1 SISO), spatial multiplexing (where bits are interleaved across tones, but not antennae), and space-frequency interleaving (SFI)). According to the illustrated embodiment, FIG. 7 graphically illustrates the performance (e.g., measured in bit error rate (BER) and packet error rate (PER) over Es/No) for a 54 Mbps/antenna. As shown, the SFI technique exhibits a modest gain of about one decibel (1 dB) in signal to noise ratio (SNR) performance relative to conventional (simpler) techniques for a receiver consisting of an MMSE spatial demapper and a soft Viterbi decoder, but should be larger for more sophisticated receivers.

Although depicted or described as comprising a number of functional elements, those skilled in the art will appreciate, based on the discussion herein, that alternate embodiments of the diversity agent 212 are anticipated within the scope and spirit of the invention. According to one example embodiment, a diversity agent that omits the antenna multiplexing and cyclic tone shift features is anticipated. In accordance with this example embodiment, diversity agent may map blocks of contiguous bits to each of at least a subset of antenna (e), and then perform 802.11a tone and QAM interleaving, and bit-to-QAM mapping described above, although the invention is not limited in this regard. A diversity agent that performs the inverse operations is also anticipated.

Figure 8:
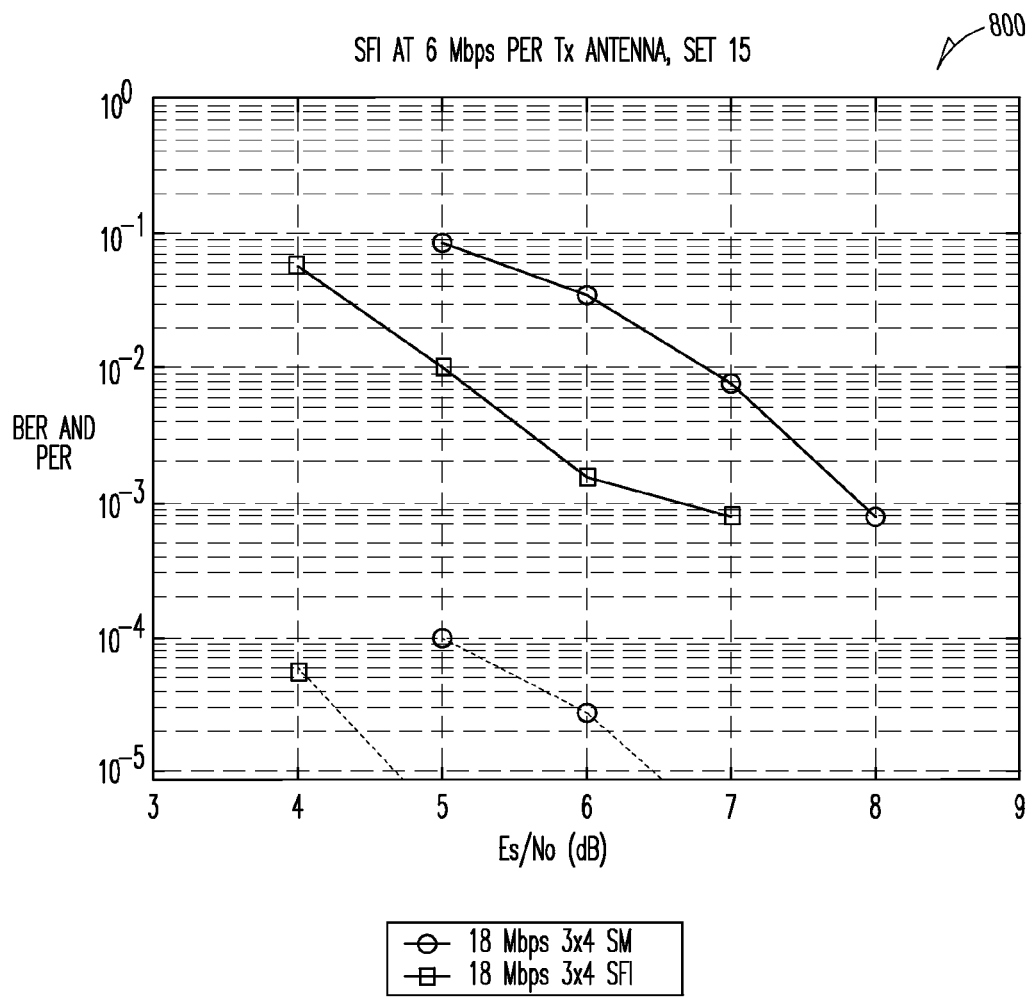
FIG. 8 provides a graphical illustration of the improvement to one or more channel characteristics through use of an embodiment of the invention.

FIG. 8 depicts a graphical illustration of a performance comparison of SFI vs. spatial multiplexing for a lower data rate of 6 Mbps per transmit antenna. As shown, the performance improvement introduced by SFI is more pronounced at lower data rates. Thus, it should be appreciated from the discussion herein that certain advantages of the proposed technique may be even more pronounced in realistic channels with impairments such as antenna gain imbalance, I/Q mismatch etc.

Alternate Embodiment(s)

Figure 9:
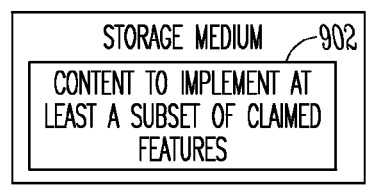
FIG. 9 is a block diagram of an example article of manufacture including content which, when executed by an accessing machine, causes the machine to implement one or more aspects of embodiment(s) of the invention.

FIG. 9 illustrates a block diagram of an example storage medium comprising content which, when invoked, may cause an accessing machine to implement one or more aspects of the diversity agent 212, 260 and/or associated methods 300, 400. In this regard, storage medium 900 includes content 902 (e.g., instructions, data, or any combination thereof) which, when executed, causes an accessing appliance to implement one or more aspects of SMA 212, 260, described above.

The machine-readable (storage) medium 900 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention may be used in a variety of applications. Although the present invention is not limited in this respect, the circuits disclosed herein may be used in microcontrollers, general-purpose microprocessors, Digital Signal Processors (DSPs), Reduced Instruction-Set Computing (RISC), Complex Instruction-Set Computing (CISC), among other electronic components. However, it should be understood that the scope of the present invention is not limited to these examples.

Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

The present invention includes various operations. The operations of the present invention may be performed by hardware components, such as those shown in FIGS. 1 and/or 2, or may be embodied in machine-executable content (e.g., instructions) 702, which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

Many of the methods are described in their most basic form but operations can be added to or deleted from any of the methods and information can be added or subtracted from any of the described messages without departing from the basic scope of the present invention. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

What is claimed is:

1. A communication station that uses a plurality of antennas for transmission of orthogonal frequency division multiplexed (OFDM) symbols, the communication station comprising:
   an interleaver to interleave a block of encoded bits of an associated input bit stream for use in generating an output bit stream having a desired code rate;
   circuitry to modulate the bits of the output bit stream to generate complex-valued modulation symbols;
   circuitry to map the modulation symbols, on a per-symbol basis, for transmit diversity and space-frequency interleaving (SFI) to multiple antennas and OFDM tones;
   circuitry to cyclically shift the mapped modulation elements;
   circuitry to provide the cyclically-shifted modulation symbols for transmission by an associated one of the antennas; and
   circuitry to add a cyclic prefix to the modulation symbols prior to transmission.

2. The communication station of claim 1 wherein the length of the cyclic prefix depends on the channel length.

3. The communication station of claim 2 further comprising a convolutional encoder, and
   wherein the interleaver receives a block of encoded bits from the convolutional encoder.

4. The communication station of claim 3 wherein the interleaver has a depth that is set based on the channel length.

5. The communication station of claim 4 wherein the mapped modulation elements are cyclically shifted by a cyclic shift between the antennas that is based on a coherence bandwidth of the channel.

6. A method for transmitting orthogonal frequency division multiplexed (OFDM) symbols using a plurality of antennas, the method comprising:
   interleaving a block of encoded bits of an associated input bit stream for use in generating an output bit stream having a desired code rate;
   modulating the bits of the output bit stream to generate complex-valued modulation symbols;
   mapping the modulation symbols, on a per-symbol basis, for transmit diversity and space-frequency interleaving (SFI) to multiple antennas and OFDM tones;
   providing the cyclically-shifted modulation symbols for transmission by an associated one of the antennas; and
   adding a cyclic prefix to the modulation symbols prior to transmission.

7. The method of claim 6 wherein the length of the cyclic prefix depends on the channel length.

8. The method of claim 7 further comprising receiving the block of encoded bits from a convolutional encoder.

9. The method of claim 8 wherein interleaving is performed by an interleaver that has a depth that is set based on the channel length.

10. The method of claim 9 wherein the mapped modulation elements are cyclically shifted by a cyclic shift between the antennas that is based on a coherence bandwidth of the channel.

* * * * *